United States Patent
Rohrs et al.

(10) Patent No.: US 7,587,309 B1
(45) Date of Patent: Sep. 8, 2009

(54) SYSTEM AND METHOD FOR PROVIDING TEXT SUMMARIZATION FOR USE IN WEB-BASED CONTENT

(75) Inventors: Christopher Rohrs, Palo Alto, CA (US); Thorsten Brants, Palo Alto, CA (US)

(73) Assignee: Google, Inc., Mountain View, CA (US)

( * ) Notice: Subject to any disclaimer, the term of this patent is extended or adjusted under 35 U.S.C. 154(b) by 955 days.

(21) Appl. No.: 10/725,883

(22) Filed: Dec. 1, 2003

(51) Int. Cl.
*G06F 17/21* (2006.01)
*G06F 17/28* (2006.01)

(52) U.S. Cl. .................. 704/10; 715/236; 715/244

(58) Field of Classification Search .............. 704/10; 715/236, 244
See application file for complete search history.

(56) References Cited

U.S. PATENT DOCUMENTS

| | | | | |
|---|---|---|---|---|
| 5,371,673 A | * | 12/1994 | Fan | 704/1 |
| 5,694,559 A | * | 12/1997 | Hobson et al. | 715/705 |
| 5,740,425 A | * | 4/1998 | Povilus | 707/100 |
| 5,774,833 A | * | 6/1998 | Newman | 704/9 |
| 5,875,446 A | * | 2/1999 | Brown et al. | 707/3 |
| 5,924,108 A | * | 7/1999 | Fein et al. | 715/531 |
| 6,181,909 B1 | * | 1/2001 | Burstein et al. | 434/353 |
| 6,230,158 B1 | * | 5/2001 | Burrows | 707/102 |
| 6,279,018 B1 | * | 8/2001 | Kudrolli et al. | 715/234 |
| 6,285,999 B1 | | 9/2001 | Page | |
| 6,311,189 B1 | * | 10/2001 | deVries et al. | 707/102 |
| 6,714,905 B1 | * | 3/2004 | Chang et al. | 704/9 |

* cited by examiner

*Primary Examiner*—David R Hudspeth
*Assistant Examiner*—Justin W Rider
(74) *Attorney, Agent, or Firm*—Straub & Pokotylo; John C. Pokotylo

(57) ABSTRACT

A system and method for providing text summarization for use in Web-based content is presented. Text is determined responsive to an executed query. Phrases within the text are identified, and words within the phrases are marked using matches of the words within the phrases with words of the executed query and/or a format rule. Marked words are placed into the summarized text subject to space restrictions. A system and method for building Web-based advertising creatives is also presented. At least one item description responsive to an executed query is identified and a name is extracted. Marked words are placed into the advertising creative subject to space restrictions.

72 Claims, 9 Drawing Sheets

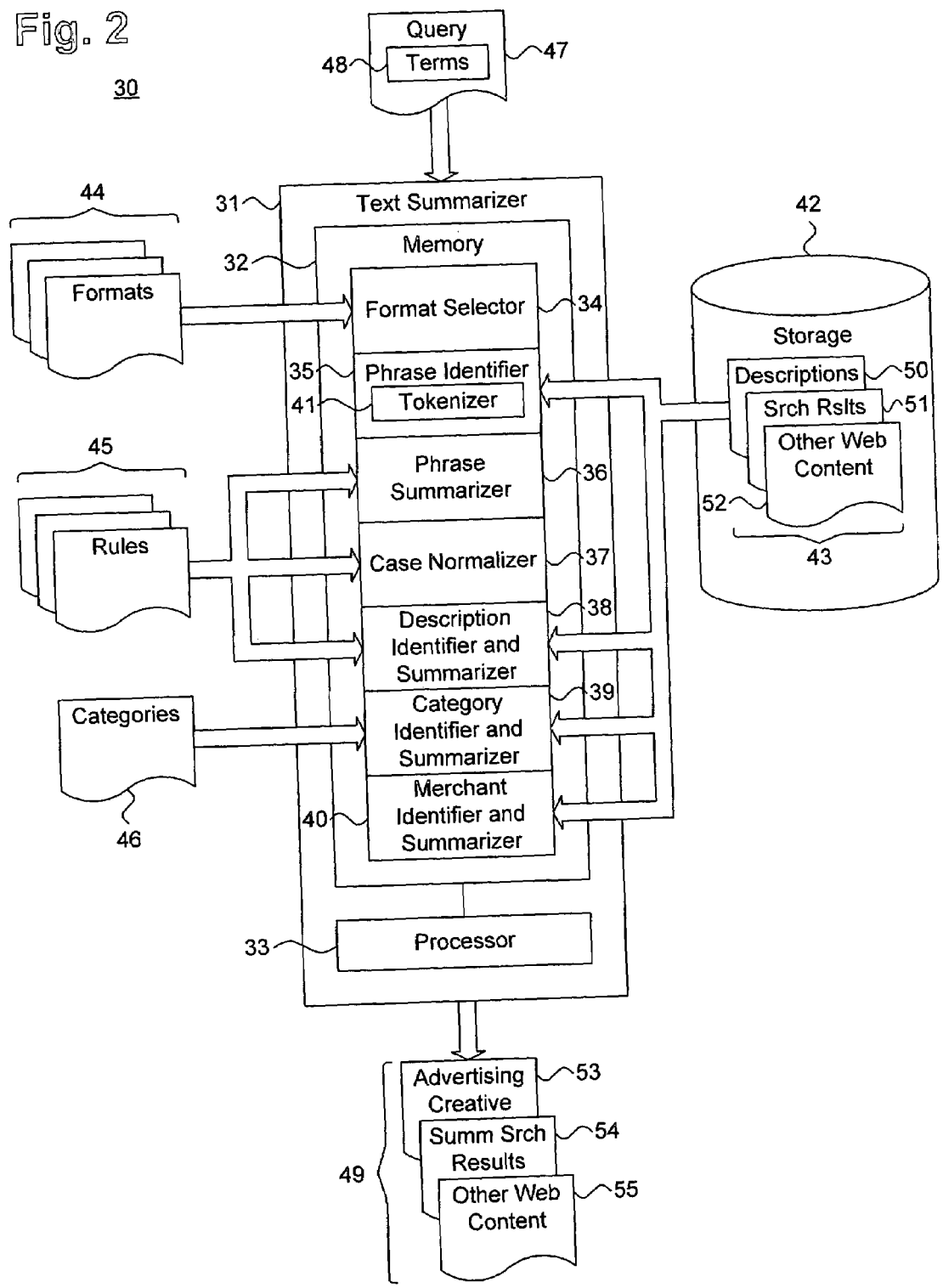

| 10344580 |

- 62 — Merchant: "Acme Brooms, Inc."
- 63 — Name: "Acme Y2K Pro-Series Broom with Extendible Handle and one meter Sweep"
- 64 — URL: "http://www.acmebrooms.com/idx"
- 65 — Price: "$9.99"
- 66 — Description: "Sleek and compact, the Acme Proton Y2K Pro-Series broom has a superior 3x extendible handle."
- 67 — Category: "Household>Cleaning Supplies>Brooms>Adjustable Brooms"
- 68 — Type: "cleaning widget"
- 69 — Classified Category: 123
- 70 — Confidence: 0.98

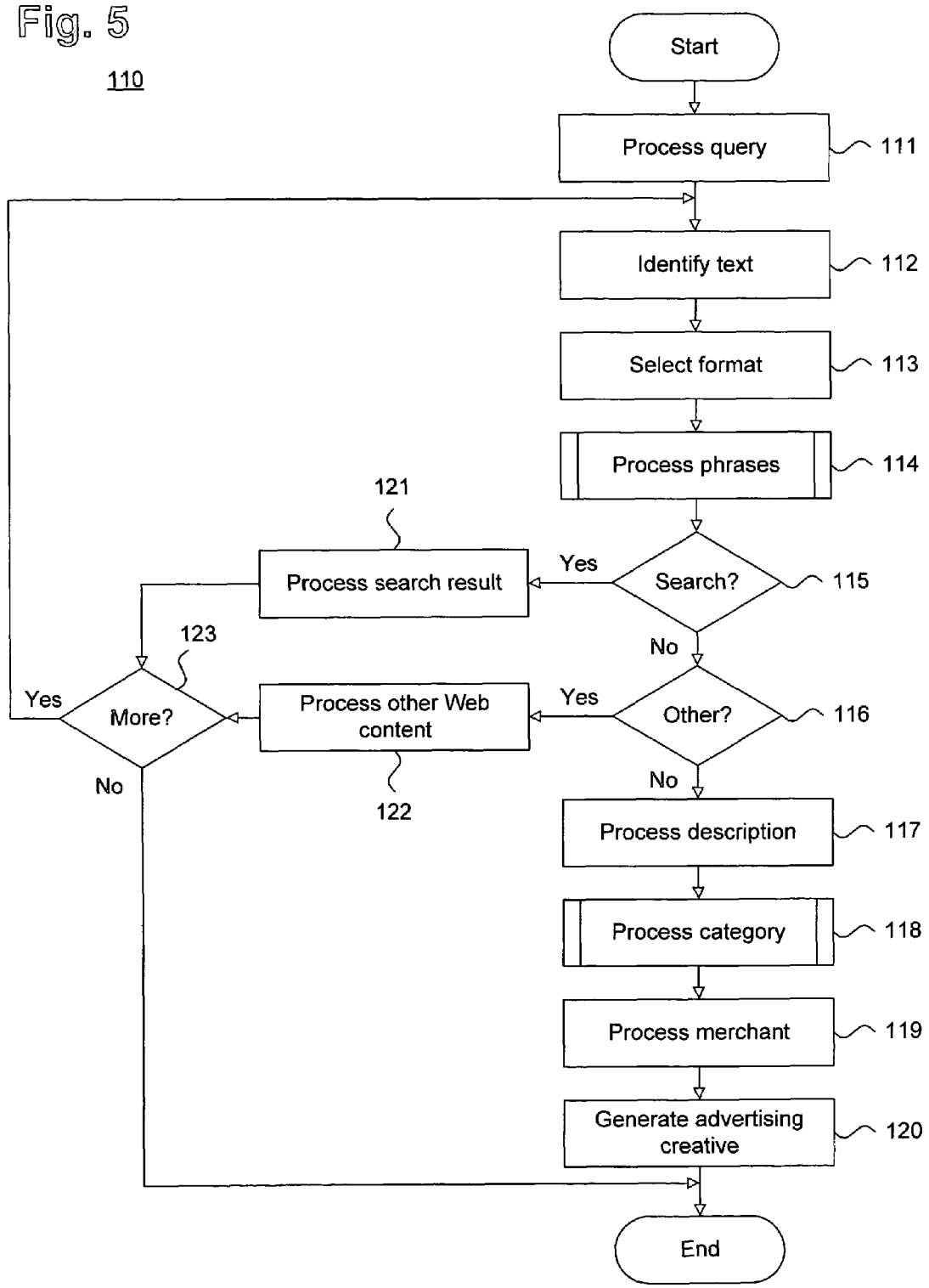

150

SYSTEM AND METHOD FOR PROVIDING TEXT SUMMARIZATION FOR USE IN WEB-BASED CONTENT

FIELD OF THE INVENTION

The invention relates in general to text summarization and, in particular, to a system and method for providing text summarization for use in Web-based content.

BACKGROUND OF THE INVENTION

Although the origins of the Internet trace back to the late 1960s, the more recently-developed Worldwide Web ("Web"), together with the long-established Usenet, have revolutionized accessibility to untold volumes of information in stored electronic form to a worldwide audience, including written, spoken (audio) and visual (imagery and video) information, both in archived and real-time formats. The Web provides information via interconnected Web pages that can be navigated through embedded hyperlinks. In short, the Web provides desktop access to a virtually unlimited library of information in almost every language.

The Web provides a readily accessible and widely available electronic communications channel to content providers of all types, from advertisers and search engines to individual end users. Web content is presented as a visual medium, which can be complemented by sound, tactile and other forms of non-visual feedback. Visual Web content includes text, images, graphics, video and similar information. The available space on every Web page is finite and both practical and physical limitations can restrict the information presented.

In particular, Web page text is often restricted. The space available for display on a Web page is limited and content providers attempt to make the best use of the space available by limiting the size and amount of text. For instance, Web-enabled cellular telephones and personal data assistant devices have considerably less display space than a full-sized computer monitor. Similarly, advertisements are often subject to strict space limits and are incentived to work within the space restrictions for practical and budgetary reasons. Web content providers frequently charge on-line advertisers for both the space occupied by each advertisement and for the number of times an advertisement is displayed to and selected by end users. Similarly, Web search engines must balance between finding quality search results and being able to only present those search results that will fit on a given Web page. Consequently, Web search engines often rank search results to ensure presentation of the best search results first. Finally, Web pages include columnar and tabular presentation formats respectively including headings and text and individual cells. Heading and cells are inherently limited in the space available and, if necessary, text must be condensed or truncated to fit.

Substantively, quality Web content gets read, yet providing salient and responsive Web content can be difficult. For instance, advertisements are frequently provided with other competing Web-based advertisements and unrelated but distracting content. Relevance and succinctness become particularly important. Product names typically are presented prominently to attract the attention of a user and each word appearing must be carefully selected to maximize user appeal yet conserve available space. Crafting a suitable product name can be particularly problematic for advertisers who have a significant body of advertisements, such as a Web retailer with a large product catalog, and such advertisers may prefer to generate Web-based advertisements through automated means, which draw advertising content from stored advertisement feeds.

Unfortunately, information contained in the stored advertisement feeds tends to be unstructured and of relatively poor quality. Generally, the advertisements are overly wordy and often contain only nouns, adjectives, conjunctions, and prepositions. Improper capitalization often occurs in the description. Consequently, information extracted from the feeds may be unsuitable for mapping directly into standardized Web-based advertisements. Moreover, arbitrarily truncating the product names can result in grammatically improper or nonsensical wording. Other types of information feeds, such as news wires, present similar challenges with respect to editing and condensing the text into quality WEB content usable within available WEB page space.

Therefore, there is a need for an approach to providing text summarization of information provided as WEB content. Preferably, such an approach would enable candidate text, including unstructured content, to fit within a limited space budget while maintaining quality and format.

Therefore, there is a further need for an approach to building standardized advertisements in the form of WEB-based advertising creatives based on information retrieved from advertising excerpts. Preferably, such an approach would identify and summarize information selected from advertising excerpts of stored advertisement feeds in a succinct fashion and relevant to user queries.

SUMMARY OF THE INVENTION

An embodiment provides a system and method for providing text summarization for use in WEB-based content. Text is determined responsive to an executed query including one or more query terms. Phrases within the text are identified. The phrases are summarized into summarized text. At least one word in the phrases is marked. Zero or more words in the phrases are matched to the query terms. At least one of a matched word or a marked word is placed into the summarized text subject to space restrictions.

A further embodiment provides a system and method for building WEB-based advertising creatives. At least one item description is identified responsive to an executed query comprising one or more query terms. A name is extracted from the item description. Phrases within the name are identified. The phrases are summarized into an advertising creative. At least one word in the phrases is marked. Zero or more words in the phrases are matched to the query terms. At least one of a matched word or a marked word is placed into the advertising creative subject to space restrictions.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respect, all without departing from the spirit and the scope of the invention. Accordingly, the drawings and detailed description are to be regarded as illustrative in nature and not as restrictive.

BRIEF DESCRIPTION OF THE DRAWINGS

FIG. 2 is a functional block diagram showing a text summarizer, in accordance with one embodiment.

FIG. 3 is a data structure diagram showing, by way of example, a product description for use by the text summarizer of FIG. 2.

FIG. 5 is a flow diagram showing a method for providing text summarization for use in WEB-based content, in accordance with one embodiment.

DETAILED DESCRIPTION

System Overview

Figure 1:
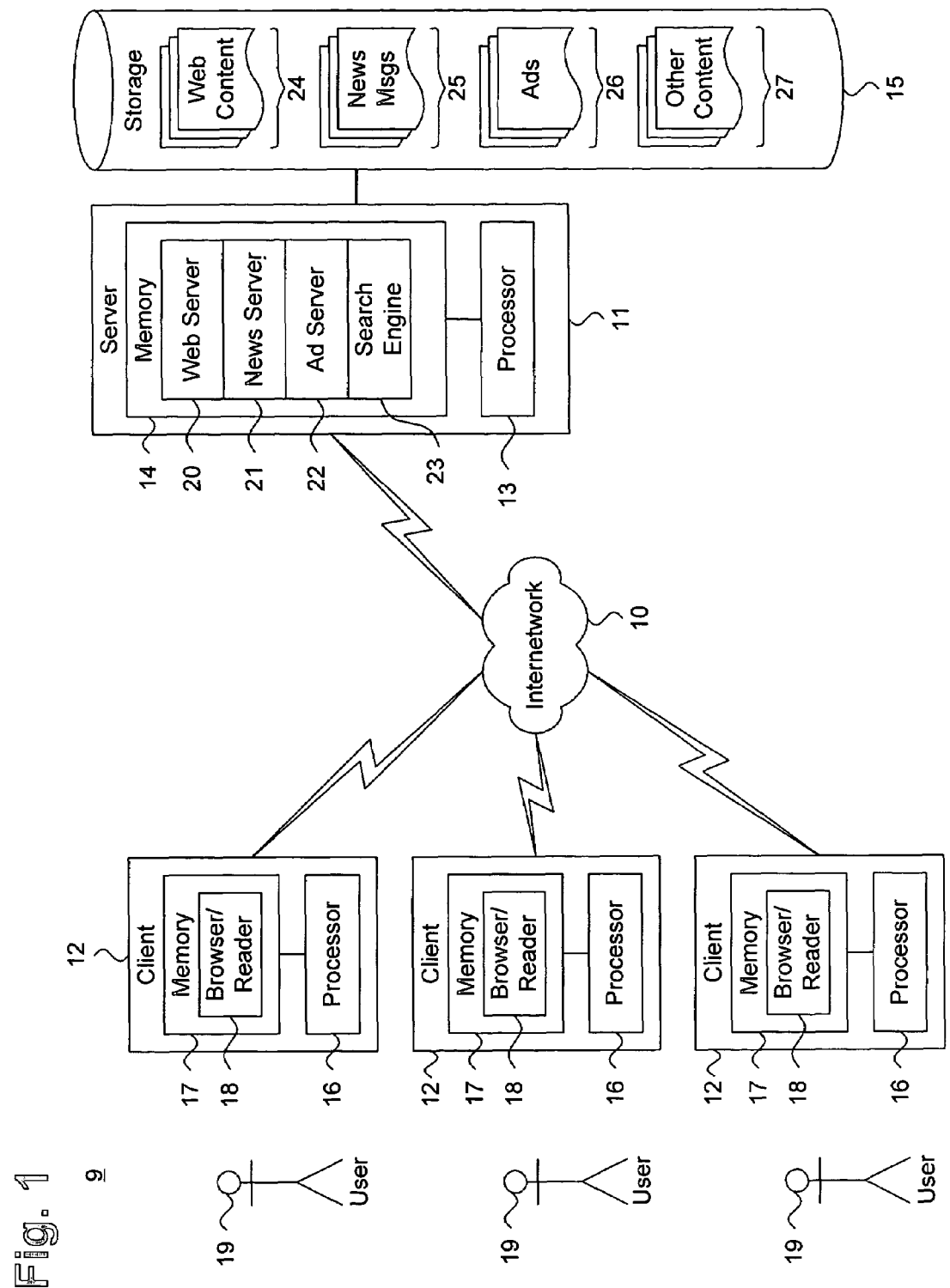
FIG. 1 is a block diagram showing a system for providing text summarization for use in WEB-based content, in accordance with the invention.

FIG. 1 is a block diagram showing a system 9 for providing text summarization for use in WEB-based content, in accordance with the invention. A plurality of individual clients 12 are communicatively interfaced to a server 11 via an internetwork 10, such as the Internet, or other form of communications network, as will be appreciated by one skilled in the art. The individual clients 12 are operated by users 19 who transact requests for WEB content, news messages, advertisements, other types of content, and other operations through their respective client 12.

Each client 12 can be any form of computing platform connectable to a network, such as the internetwork 10, and capable of interacting with application programs. Exemplary examples of individual clients include, without limitation, personal computers, digital assistants, "smart" cellular telephones and pagers, lightweight clients, workstations, "dumb" terminals interfaced to an application server, and various arrangements and configurations thereof, as will be appreciated by one skilled in the art. The internetwork 10 includes various topologies, configurations, and arrangements of network interconnectivity components arranged to interoperatively couple with enterprise, wide area and local area networks and include, without limitation, conventionally wired, wireless, satellite, optical, and equivalent network technologies, as will be appreciated by one skilled in the art.

For WEB content retrieval and news message posting and retrieval, each client 12 executes a Web browser and news reader application 18 ("Browser/Reader"). WEB content 24 is requested via a WEB server 20 executing on the server 11. Similarly, news messages ("News Msgs") 25 are posted and retrieved via a news server 21 also executing on the server 11. In addition, advertisements ("Ads") 26 are provided with the WEB content 24, news messages 25, and other content 27 via an advertisement server ("Ad Server") 22 also executing on the server 11. The advertisements 26 provide stored advertisement feeds and can also include standardized advertisements that normalize the general layout and appearance of WEB-based advertisements through a common format, such as product name and body. The advertisement server 22 can target the advertisements 26 for inclusion with or in lieu of the WEB content 24, news messages 25, and other content 27, such as described in commonly-assigned U.S. patent application Ser. No. 10/676,195, filed Sep. 30, 2003, pending, the disclosure of which is incorporated by reference. Other types of server functionality can be provided, as will be appreciated by one skilled in the art. Note the WEB browsing, news reading, and advertising functions could also be implemented separately as stand alone applications.

The server 11 maintains an attached storage device 15 in which the WEB content 24, news messages 25, advertisements 26, and other content 27 are stored. The WEB content 24, news messages 25, advertisements 26, and other content 27 could also be maintained remotely on other WEB and news servers (not shown) interconnected either directly or indirectly via the internetwork 10 and which are preferably accessible by each client 12.

A search engine 22 executes on the server 11 for processing queries for WEB content 24, news messages 25, advertisements 26, and other content 27. Each query is meant to describe or otherwise identify information potentially retrievable via either the Web server 20 or news server 21. The information can include other information also determined to be relevant to the query. In one embodiment, each query provides characteristics, typically expressed as terms, including individual words and compounds. The search engine 22 receives a query, identifies matching WEB content 24, news messages 25, advertisements 26, and other content 27, including text, and sends back search results conforming to the query preferences. Other styles, forms or definitions of queries, query characteristics, and related metadata are feasible, as will be appreciated by one skilled in the art.

In one embodiment, the search engine 22 identifies the WEB content 24, news messages 25, advertisements 26, and other content 27 determined to be highly relevant in relation to a given set of search query terms, for example, using such techniques as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching WEB content 24, news messages 25, advertisements 26, and other content 27, the search engine 22 operates on information characteristics describing potentially retrievable content. Note the functionality provided by the server 20, including the WEB server 20, news server 21, advertising server 22, and search engine 23, could be provided by a loosely- or tightly-coupled distributed or parallelized computing configuration, in addition to a uniprocessing environment.

The space available for displaying WEB content, including the WEB content 24, news messages 25, advertisements 26, and other content 27, is limited. To assist with fitting text contained in the WEB content for display within the limited space budget of a WEB page, a text summarizer (not shown) summarizes the text, as further described below with reference to FIG. 2.

The individual computer systems, including server 11 and clients 12, include general purpose, programmed digital computing devices including a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Text Summarizer

FIG. 2 is a functional block diagram 30 showing a text summarizer 31, in accordance with one embodiment. The text summarizer 31 summarizes text 43, which can include text extracted from product descriptions ("Descriptions") 50, search results ("Srch Rslts") 51 and other WEB content 52, into summarized text 49. The text can also be extracted from other non-WEB content sources, including virtual private and local networks. The text summarizer 31 uses the terms 48, which constitute each query 47, to help identify and summarize the information contained within the text 43. The summarized text 49 is then provided to the server 11 (shown in FIG. 1) as an advertising creative 53, summarized search results ("Summ Srch Results") 54 and summarized WEB content 55 for inclusion with or in lieu of the WEB content 24, news messages 25, and other content 27.

The individual computer system, including the text summarizer 31, include general purpose, programmed digital computing devices including a central processing unit (processor 33), random access memory (memory 32), non-volatile secondary storage 37, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Advertising Creative Generation

The text summarizer 31 includes storage 42 for maintaining the text 43. In one embodiment, the text 43 includes the product descriptions 50, such as further described below, by way of example, with reference to FIG. 3. The text summarizer 31 builds a WEB-based advertising creative 53 from information obtained from one or more product descriptions 50. The product descriptions 50 are preferably selected by the advertising server 22 (shown in FIG. 1), which targets advertisements based on a query 47 received from a user 19. The text summarizer 31 uses the terms 48, which constitute each query 47, to help identify and summarize the information contained within the product description 50 and the advertising creative 53 is then provided to the advertising server 22 for inclusion with or in lieu of the WEB content 24, news messages 25, and other content 27.

The text summarizer 31 includes a format selector 34, phrase identifier 35, phrase summarizer 36, case normalizer 37, description identifier and summarizer 38, category identifier and summarizer 39, and merchant identifier and summarizer 40. The format selector 34 identifies a predefined WEB-based format 44 for the advertising creative 53. Each advertising creative 53 can include a product name and a body containing an extended product name, description, category name, merchant information, or other content, as further described below, by way of example, with reference to FIGS. 4A-D. Although described with reference to product offerings, the advertising creative 53 can also be used to describe service or combined product and service offerings. Accordingly, the terms "product" and "service" are considered interchangeable and, except as expressly provided otherwise, apply equally to either or both product and service offerings. Each advertising creative 53 must fit within a limited amount of space. As a result, information provided in the text 43 is evaluated before being placed within an advertising creative 53 to meet the space restrictions.

Each product name appearing in an advertising creative 53 is limited to a fixed number of characters. In one embodiment, each product name is displayed in an advertising creative 53 in a slightly larger type size with underlining and is limited to 25 characters. Accordingly, the product name appearing in an advertising creative 53 should be succinct and relevant to the query received from the user 19. The phrase identifier 35 and phrase summarizer 36 tokenize, analyze and restate a product name identified in text 43 to condense and optimize the actual product name appearing in an advertising creative 53, subject to space restrictions, as further described below with reference to FIGS. 7 and 8.

The phrase identifier 35 retrieves text 43 and tokenizes the product name identified in the text 43 into individual words based on breaking punctuations, parenthetical text and breaking prepositions. The words are then grouped into phrases. The product name identified in the text 43 can be tokenized using regular expressions or with a tokenizer 41. The phrase summarizer 36 analyzes the tokenized phrases and attempts to place zero or more words identified in the phrases into the product name of the advertising creative 53. A word includes any sequence of characters appearing in a contiguous order or connected by an express grammatical connector, such as a hyphen or underscore. The phrase summarizer 36 can apply rules 35 that formalize the conventions and practices used in the application of ordinary grammar and, for example, editorial guidelines. The phrase summarizer 36 can operate in conjunction with the case normalizer 37, which corrects the capitalization of the individual phrases by recognizing non-standard variations of capitalization and also by applying the rules 45, such as described in commonly-assigned U.S. patent application, Ser. No. 10/716,951, filed Nov. 18, 2003, pending, the disclosure which is incorporated by reference.

The remaining components, the description identifier and summarizer 38, category identifier and summarizer 39, and merchant identifier and summarizer 40, provide and summarize, if necessary, product description, category, and merchant information used in the body of the advertising creative 53, subject to space restrictions. The description identifier and summarizer 38 provides a product description based on product information identified in the text 43. In one embodiment, the description identifier and summarizer 38 attempts to fit as many sentences from the description identified in the text 43 into the body of the advertising creative 53 based on available space. Preferably, the sentences are not truncated, but can be reformatted to conform to the line widths of the advertising creative 53.

In a further embodiment, the description identifier and summarizer 38 retrieves sentences from the product description based on the query 47 and product name, if known. A parse tree of the product description 50 is created. During a first pass, the description identifier and summarizer 38 attempts to fit as many of the retrieved sentences that can fit into the body of the advertising creative 53 based on available space. During a second pass, the description identifier and summarizer 38 traverses the parse tree, preferably in a breadth-first order, and outputs constituents that meet available space and syntactic constraints, such as "complicated" noun phrases containing adjectives, numbers and prepositional phrases; verbs not starting with auxiliary verbs; and adjective phrases or sentences.

The category identifier and summarizer 39 provides a category name based on category information identified in the text 43, as further described below with reference to FIG. 8. The category associated with a product described in text 43 can be a simple category label, can be retrieved from a hierarchy of category names 46, or can be classified by closest fit. The category identifier and summarizer 39 summarizes the names of hierarchical categories 46 to remove redundancies and also selects the classified category name with a satisfactory confidence level.

Finally, the merchant identifier and summarizer 40 provides merchant information based on merchant information identified in the text 43 in the advertising creative 53 and related records. Merchant information can include the name of the merchant, geographical and physical locations, telephone number, e-mail address, Website, slogan, and other information relevant to the merchant.

Search Results Text Summarization

In a further embodiment, the text 43 can include search results 51, such as identified by the search engine 23. Analogous to building a Web-based advertising creative 53, the text summarizer 31 builds summarized search results 54 from information obtained from one or more search results 51. The search results 51 are preferably identified by the search engine 23 (shown in FIG. 1) based on an executed query 47 received from a user 19. The text summarizer 31 uses the term 48, which constitute each query 47, to help identify and summarize the information contained within the search results 51 and the summarized search results 54 are then provided to the search engine 23 for presentation.

The text summarizer 31 includes a format selector 34, phrase identifier 35, phrase summarizer 36, and case normalizer 37. The format selector 34 identifies a predefined Web-based format 44 for the summarized search results 54. Each summarized search result 54 can include a heading and text. Each summarized search result 54 must fit within a limited amount of space. As a result, information provided in the text 43 is evaluated before being placed within a summarized search result 54 to meet the space restrictions.

Each heading appearing in a summarized search result 54 is limited to a fixed number of characters. In one embodiment, the phrase identifier 35 identifies and extracts an existing heading in the text 43 or, if an existing heading is not found, a first sentence or phrase. The phrase summarizer 36 summarizes the extracted information summarized into a heading that is preferably displayed as a hyperlink in the summarized search result 54. If the extracted information cannot fit within the space available even after summarization, the heading is preferably truncated with the truncated material replaced by a set of ellipses. The phrase summarizer 36 can operate in conjunction with the case normalizer 37, which corrects the capitalization of the individual phrases by recognizing non-standard variations of capitalization and also by applying the rules 45, such as described in commonly-assigned U.S. patent application, Ser. No. 10/716,951, filed Nov. 18, 2003, pending, the disclosure which is incorporated by reference.

Other Web Content Text Summarization

In a still further embodiment, the text 43 can include other Web content 52, including the Web content 24, news messages 25, advertisements 26, and other content 27 stored by the server 11 (shown in FIG. 1), as well as documents and excerpts from other sources. Analogous to building a Web-based advertising creative 53, the text summarizer 31 builds summarized Web content 55 from other Web content 52, including the Web content 24, news messages 25, advertisements 26, and other content 27, for display in a specified format, such as in a table or set of columns. The other Web content 52 is preferably identified by the search engine 23 (shown in FIG. 1) based on an executed query 47 received from a user 19. The text summarizer 31 uses the terms 48, which constitute each query 47, to help identify and summarize the information contained within the other Web content 52 and the summarized Web content 55 is then provided to the search engine 23 for formatted presentation.

The text summarizer 31 includes a format selector 34, phrase identifier 35, phrase summarizer 36, and case normalizer 37. The format selector 34 identifies a predefined Web-based format 44 for the summarized Web content 55. For example, the summarized Web content 55 could be presented in a table or set of columns and each item of summarized Web content 55 would need to fit within the width of each cell or column entry. Information provided in the text 43 is evaluated before being placed as summarized Web content 55 to meet the space restrictions.

Assuming that the summarized Web content 55 is limited to a fixed number of characters, the phrase identifier 35 identifies and extracts an existing heading in the text 43 or, if an existing heading is not found, a first sentence or phrase. The phrase summarizer 36 condenses the extracted information as summarized Web content 55 into a size suitable to the format. If the summarized Web content 55 cannot fit within the space available even after summarization, the summarized Web content 55 is truncated with the truncated material replaced by a set of ellipses. The phrase summarizer 36 can operate in conjunction with the case normalizer 37, which corrects the capitalization of the individual phrases by recognizing non-standard variations of capitalization and also by applying the rules 45, such as described in commonly-assigned U.S. patent application, Ser. No. 10/716,951, filed Nov. 18, 2003, pending, the disclosure which is incorporated by reference.

Advertising Excerpt Data Structure

FIG. 3 is a data structure diagram 60 showing, by way of example, a product description 61 for use by the text summarizer 31 of FIG. 2. Although described with reference to a description of a product, descriptions of services, combinations of products and services, and similar items could equally be applied. The product description 61 is preferably organized as a structured record or similar type of organization, whereby individual fields representing predefined categories of product information can be identified. By way of non-exclusive example, in one embodiment, the advertising excerpt fields include the following:

Merchant (62): Identifies the name of a merchant providing the product or service. Additional merchant-related information can be obtained by performing a lookup of a related merchant records (not shown). Alternatively, the merchant field 62 can include complete merchant information.

Name (63): Provides the name of the product or service.

URL (64): Provides a Uniform Resource Locator (URL) or similar hyperlink reference to identify on-line product or service information.

Price (65): Provides a price, range of prices, opening bid, or similar pricing information associated with the product or service.

Description (66): Specifies a description of the product or service. Preferably, the description field 66 is written in complete sentences or phrases.

Category (67): Identifies the category name or category path, if a hierarchy of category names 46 is used, to which the product description 61 is most closely related.

Type (68): Provides a generic product or service type identifier.

Classified Category (69): Associates a classified category name most closely matching the product or service based on an approximated best fit. The classified category 69 could be different than the assigned category 67.

Confidence (70): Specifies the level of confidence assigned to the classified category 69.

Other fields, types and collections of product and service information could be provided, either in addition to or in lieu of the forgoing, and can include metadata as well as explicit information, as will be appreciated by one skilled in the art.

Advertising Creatives

FIGS. 4A-D are diagrams showing, by way of example, advertising creatives 53 generated by the text summarizer 31 of FIG. 2. An advertising creative provides information about a product or service and can include text, images, sounds, and other content. An advertising creative can summarize the product or service information contained within corresponding advertising excerpts 46. In a further embodiment, an advertising creative can be based on the names of categories or can be based on any other type or source of information describing the products or services.

An advertising creative need not follow a prescribed form and the format adopted by a particular advertising creative will depend in part upon the size and display characteristics of the Web page upon which the advertising creative will be provided. Standardized advertising creatives facilitate placement of multiple advertisements on a given Web page. When provided as standardized Web-based advertisements, each advertising creative includes a product name and a body. The product name is preferably visually distinct from the body and can be presented, for example, in a larger type size with underlining, or in any other format suitable for display as Web-based content. The body presents additional information and can non-exclusively include an extended product name, description, category name, and merchant information. The body can be presented, for example, in a smaller type size, or in any other format suitable for display as Web-based content. Both the product name and body can include hyperlinks referencing further Web content. Additionally, the entire advertising creative can be provided in a frame and visually accented through the use of color in the text and frame.

Figure 4A:
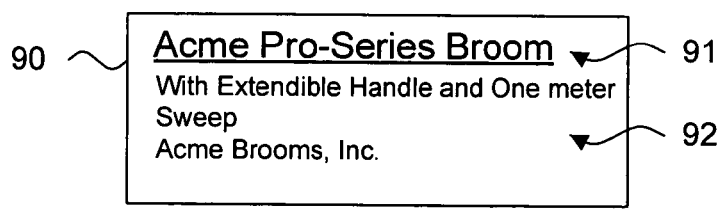
FIGS. 4A-D are diagrams showing, by way of example, advertising creatives generated by the text summarizer of FIG. 2.

Referring first to FIG. 4A, an advertising creative 90 having a product name 91 and body containing an extended product name 92 is shown. The extended product name 92 provides the remaining part of the product name 63 identified in the product description 61 that the text summarizer 31 was unable to fit into the product name 91 of the advertising creative 90, subject to any space constraints. Other formats, styles and articulations of product names and extended product names are possible in alternative embodiments, as are various advertising creative constraints.

Figure 4B:
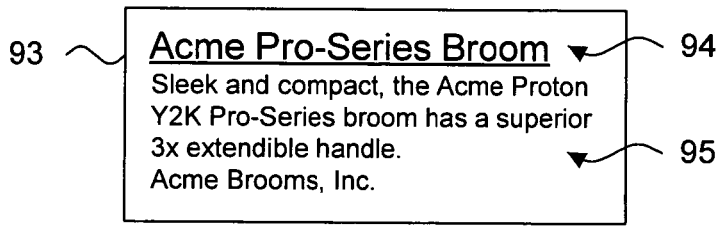

Referring next to FIG. 4B, an advertising creative 93 having a product name 94 and body containing a description 95 is shown. The description 95 provides the description 66 originally identified in the product description 61, subject to any space constraints. In one embodiment, sentences appearing in the original description 66 are not truncated, but can be reformatted to conform to the line widths of the advertising creative 93. In a further embodiment, the original description 66 is summarized, for instance, to emphasize information potentially relevant to the user 19, such as shipping or discount information. In alternative embodiments, other formats, styles and articulations of product names and descriptions are possible, as will be appreciated by one skilled in the art.

Figure 4C:
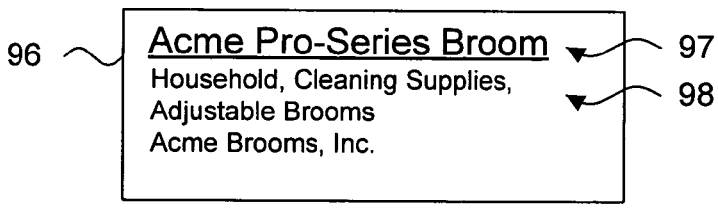

Referring next to FIG. 4C, an advertising creative 96 having a product name 97 and body containing a category name 98 is shown. The category name 98 provides the summarized category 67 identified in the product description 61, subject to any space constraints. In one embodiment, category names retrieved from a structured hierarchy are preferably summarized to remove redundancies. Other formats, styles and articulations of product names and category names are possible, as will be appreciated by one skilled in the art.

Figure 4D:
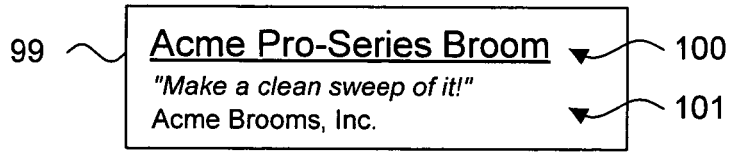

Finally, referring to FIG. 4D, an advertising creative 99 having a product name 100 and body containing merchant information 101 is shown. The merchant information 101 provides the merchant information 62 identified in the product description 61 and related records, subject to any space constraints. For example, an advertising slogan, such as "Make a clean sweep of it!," can be retrieved from a related record and provided as the merchant information 101. Other formats, styles and articulations of product names and extended product names are possible, as will be appreciated by one skilled in the art.

In one embodiment, each advertising creative 90, 93, 96, 99 is provided as phrase content written in a suitable variant of a hypertext markup language, such as the Hypertext Markup Language (HTML).

Method Overview

FIG. 5 is a flow diagram showing a method 110 for providing text summarization for use in phrase-based content 49, in accordance with one embodiment. The method 110 is described as a sequence of process operations or steps, which can be executed, for instance, by the text summarizer 31 of FIG. 2 or other components.

The method 110 begins by processing a query 47 and identifying text 43 (blocks 111 and 112, respectively), such as extracted from the product descriptions 50, search results 51, or other phrase content 52. The text can also be extracted from other non-phrase content sources, including virtual private and local networks. A format 44 for summarized text 49 is selected (block 113) and phrases are processed (block 114), either by content or parts of speech, to form the summarized text 49, as further described below respectively with reference to FIGS. 6 and 7. Next, the summarized text 49 is processed depending upon whether the summarized text 49 is to be provided as an advertising creative 53, summarized search results 54 or summarized WEB content 55 (blocks 115-123).

If the summarized text 49 is being provided as an advertising creative, that is, the text 43 is neither search results 51 (block 115) nor other phrase content (block 116), an advertising creative 53 is generated, as follows. Depending upon the format 44 selected, a description 66 (block 117), a category 67 (block 118), as further described below with reference to FIG. 8, and merchant information 62 (block 119) are processed. Finally, the advertising creative 53 is generated (block 120) as a standardized phrase-based advertisement. The routine then terminates.

Otherwise, if the summarized text 49 is being provided as summarized search results 54 (block 115), the summarized phrase is processed into a summarized search result 54 (block 121). The summarized phrase is summarized into a heading that is preferably displayed as a hyperlink in the summarized search result 54. If the extracted information cannot fit within the space available even after summarization, the heading is preferably truncated with the truncated material replaced by a set of ellipses. If further search results require summarization (block 123), processing continues. Otherwise, the routine terminates.

Finally, if the summarized text 49 is being provided as summarized Web content 55 (block 116), the phrase is processed into summarized Web content 55 (block 122) depending upon the format 44 selected. For example, the summarized Web content 55 could be presented in a table or set of columns and each item of summarized Web content 55 would need to fit within the width of each cell or column entry. Assuming that the summarized Web content 55 is limited to a fixed number of characters, the summarized phrase is condensed into a size suitable to the format 44. If the summarized Web content 55 cannot fit within the space available even after summarization Web content 55 is truncated with the truncated material replaced by a set of ellipses. If further other Web content 52 require summarization (block 123), processing continues. Otherwise, the routine terminates.

Processing Phrases By Content

Figure 6:
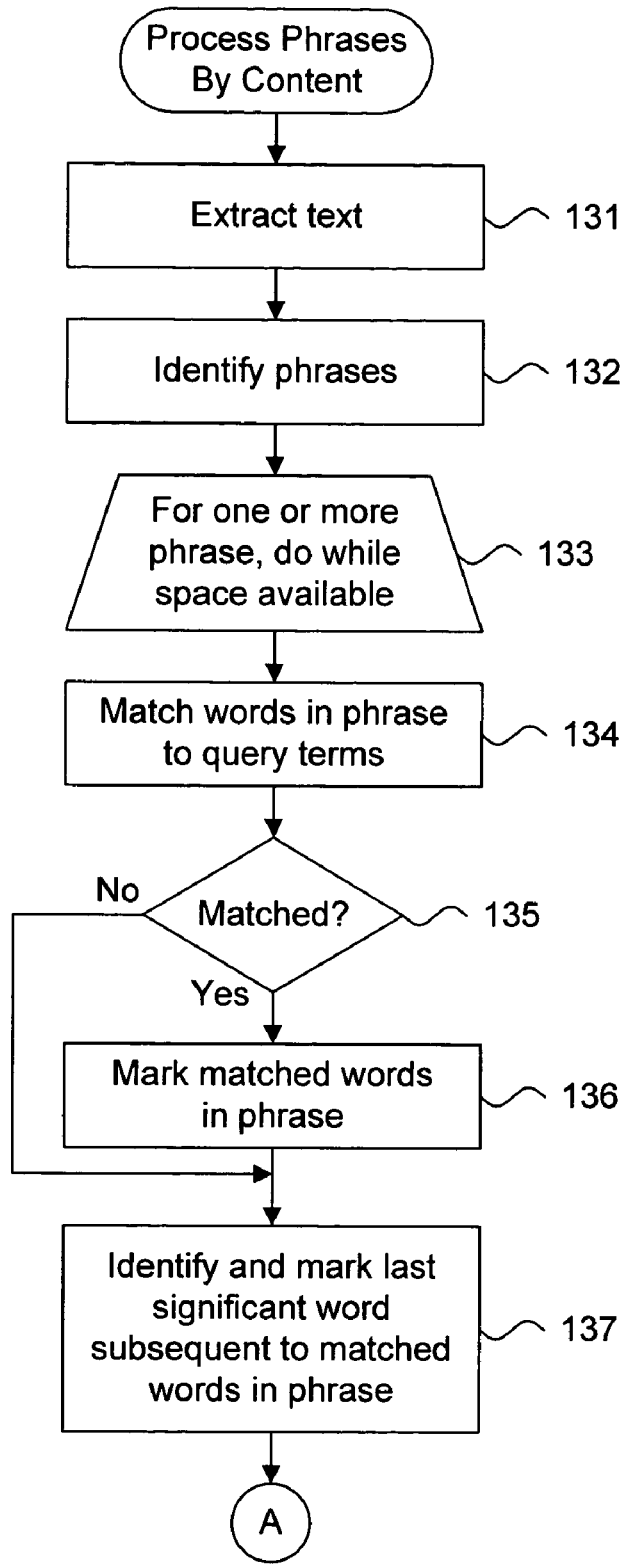
FIG. 6 is a flow diagram showing the routine for processing phrases by content for use in the method of FIG. 5.
Figure 6:
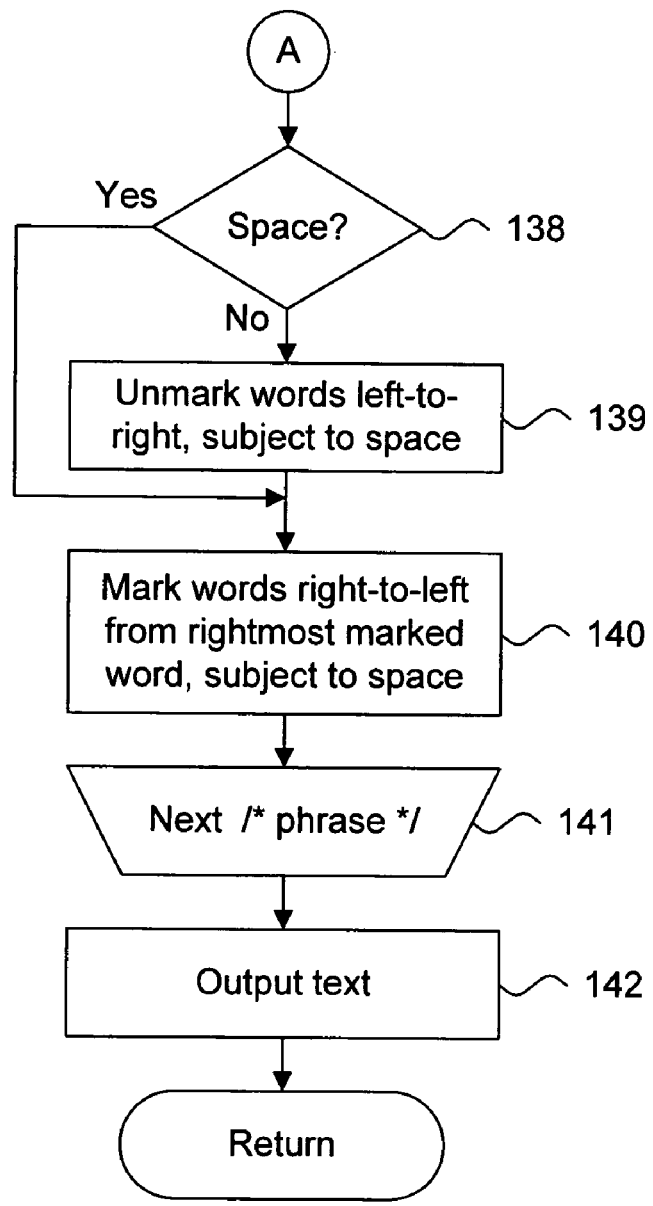

FIG. 6 is a flow diagram showing the routine 130 for processing phrases by content for use in the method 110 of FIG. 5. One purpose of the routine is to identify phrases by analyzing content within text 43 and to summarize the identified phrases as summarized text 49 to fit within the space restrictions of an advertising creative 53, summarized search result 54 or summarized Web content 55.

As an initial step, the text 43 is extracted from the product descriptions 50, search results 51, or other Web content 52 (block 131). Phrases within the text 43 are then identified (block 132). In one embodiment, the phrases are identified based on breaking punctuation marks and breaking prepositions not appearing in a first word, or as parenthesized text. A breaking punctuation mark includes a colon, dash, or semicolon. A dash is a hyphen separated by spaces on both sides or may be identified otherwise, such as by a double hyphen. Parenthesized text includes text that appears between a set of matching parentheses or brackets. Breaking prepositions include without limitation the words "from," "with," "for," and "in." Commas can be treated as breaking punctuation marks, but must be parsed selectively. Commas used to separate items in a list are not breaking punctuation marks, while commas used to separate prepositional or noun phrases are delimiters that can be treated as breaking punctuation marks. A word includes any sequence of characters appearing in a contiguous order or connected by an express grammatical connector, such as a hyphen or underscore. Accordingly, an identified phrase is parenthesized text, quoted text, or a sequence of individual words not containing breaking punctuations, parenthesized text, or breaking prepositions other than in a first word. A word can also include two or more words that form a compound word, whose meaning is generally understood in combination. For instance, "San Francisco" is a two-word compound referring to a city in Northern California. In a further embodiment, compound words are identified for inclusion as part of a phrase, such as described in commonly-assigned U.S. patent application Ser. No. 10/647,203, filed Aug. 21, 2003, pending, the disclosure of which is incorporated by reference.

By way of example, the product name 63 (shown in FIG. 3) provides "Acme Y2K Pro-Series Broom with Extendible Handle and one meter Sweep." This product name 63 includes the phrases "Acme Y2K Pro-Series Broom" and "with Extendible Handle and one meter Sweep."

Next, one or more of the identified phrases are iteratively processed while space remains available in the advertising creative 53, summarized search result 54 or summarized Web content 55 (blocks 133-141), as follows. Each identified phrase is considered independently from the other phrases and all of the identified phrases need not be processed. Rather, one or more individual phrases, such as the first phrase in the text 43, can be selectively processed. First, zero or more of the words in each phrase are matched, if possible, to a term 48 in the query 47 (block 134). Matching the words to the terms 48 in the query 47 helps to identify those words within the text 43 that are likely most relevant to the user 19 and can be instructive when summarizing the text 43 for use in the advertising creative 53, summarized search result 54 or summarized Web content 55. Preferably, capitalization is ignored when matching queries 47 and terms 48. If one or more word matches are found (block 135), the words are logically marked (block 136). Each word is considered independently from the other words and all of the matching words need not be included. Rather, one or more individual words can be selectively used. By way of continuing example, assuming a query 47 that included the search terms 48 "Acme" and "Broom," the marked words, indicated in boldface, would include "Acme Y2K Pro-Series Broom" and "with Extendible Handle and one meter Sweep."

Following the logical marking of words in each phrase, the last significant word, if any, occurring subsequent to the matched words is identified and logically marked (block 137). In one embodiment, the last significant word is the rightmost word following the last marked word within the same phrase that matches the regular expression: "^\W*([A-Z][a-z]+(-[A-Z][a-z]+)?|[A-Z]+|[0-9]+)\W*$," where "^\([A-Z][a-z]+(-[A-Z][a-z]+)?" matches a title-case word that could be hyphenated, "[A-Z]+" matches an uppercase word, and "[0-9]\W*$" matches a number. Other forms of regular expressions could be used, as will be appreciated by one skilled in the art. By way of continuing example, the marked words, indicated in boldface, would still include "Acme Y2K Pro-Series Broom" and "with Extendible Handle and one meter Sweep" and application of the regular expression would result in no further marked words.

If the current sequence of words in the advertising creative 53, summarized search result 54 or summarized Web content 55 is too long (block 138), words in each phrase are logically unmarked in left-to-right order until the cumulative size of all marked words, including white space, fits into the space available (block 139). By way of continuing example, the marked words, indicated in boldface, would still include "Acme Y2K Pro-Series Broom" and "with Extendible Handle and one meter Sweep" with no marked words in either phrase being logically unmarked.

Next, words in each phrase are logically marked in right-to-left order, beginning with the rightmost marked word, subject to space available in the advertising creative 53, summarized search result 54 or summarized Web content 55 (block 140). Since English is a right-headed language that places noun modifiers to the right of the noun being modified, the words are deleted from the product name 91 from left-to-right and added from right-to-left. Thus, by way of example, the marked words, indicated in boldface, would now include "Acme Y2K Pro-Series Broom" and "with Extendible Handle and one meter Sweep," assuming a product name 90 limited to 25 characters. In a further embodiment, words in each phrase can be logically marked in left-to-right order to support left-headed languages, such as Japanese and French. Other types of markings could also be used for languages that use neither right- nor left-headed. Processing continues with the next phrase (block 141).

Finally, the text 43 is output (block 142) by providing the final set of marked words for inclusion in the advertising creative 53, summarized search result 54 or summarized Web content 55. The routine then returns.

In a further embodiment, the summarized text 49 is assigned a confidence score that provides an estimate of the quality of the text summary. The confidence score can be used, for instance, by the advertising server 22 or search engine 23 as feedback from the text summarized 31. An initial confidence score is assigned to the text 43 prior to summarization. Discounting factors are associated with different types of deletions based on linguistic knowledge and empirical analysis, such as deletions using the certain punctuation marks or prepositional phrases. In addition, some words count more than other words and the confidence score adjusts the confidence score to discount the dropping of more important words than the dropping of other words. An overall confidence score is then determined by multiplying the appropriate discount factor by the number of words deleted. Other forms of confidence scoring are also possible.

Processing Phrases By Parts of Speech

Figure 7:
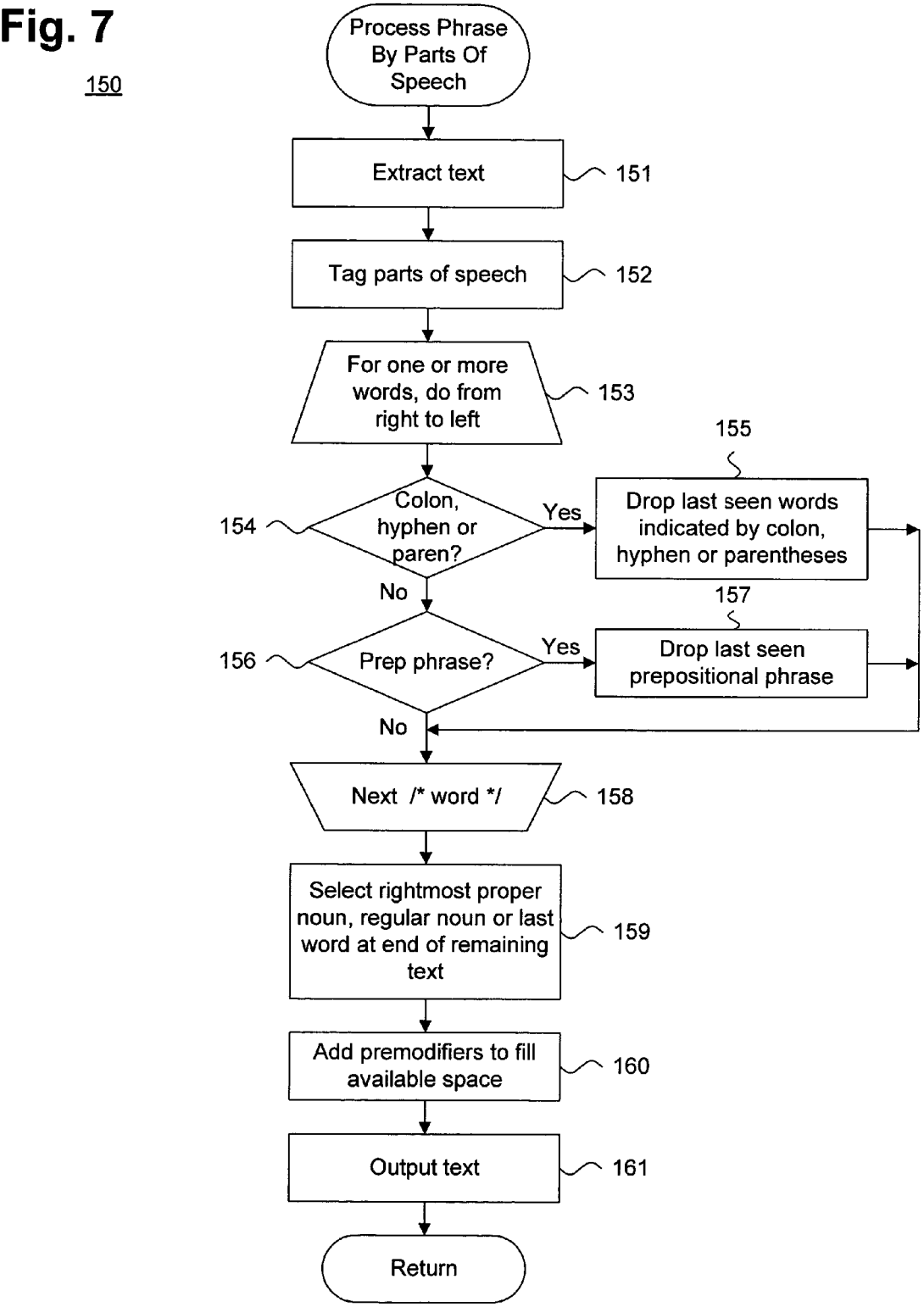
FIG. 7 is a flow diagram showing the routine for processing phrases by parts of speech for use in the method of FIG. 5.

FIG. 7 is a flow diagram showing the routine 150 for processing phrases by parts of speech for use in the method 110 of FIG. 5. One purpose of the routine is to identify phrases by analyzing parts of speech within text 43 and to summarize the identified phrases as summarized text 49 to fit within the space restrictions of an advertising creative 53, summarized search result 54 or summarized Web content 55.

As an initial step, the text 43 is extracted from the product descriptions 50, search results 51, or other Web content 52 (block 151). Parts of speech within the text 43 are then tagged (block 152), such as by using Hidden Markov Models. Commas must be parsed selectively to distinguish between commas used to separate items in a list from commas used to separate prepositional or noun phrases, where the latter are termed delimiters. In a further embodiment, a word can also include two or more words that form a compound word, whose meaning is generally understood in combination, as described above with reference to FIG. 6.

Next, one or more of the words is iteratively processed from right to left (blocks 153-158), as follows. Each word is considered independently from the other words and all of the words need not be included. Rather, one or more individual words can be selectively processed. First, if a hyphen, colon or parentheses occurs (block 154), the last seen words are considered to be delimited words, which are dropped (block 155). Delimited words are words separated by select hyphens, colons and parentheses, as well as other punctuations functioning to separate prepositional phrases. Similarly, if the word is a preposition (block 156), the last seen prepositional phrase is dropped (block 157). Processing continues with the next word (block 158). By way of continuing example, the prepositional phrases "with Extendible Handle" and "and one meter Sweep" would be dropped.

Following the processing of words, the rightmost proper noun is selected, if possible (block 159). However, if a regular noun immediately follows the proper noun, the regular noun is selected. If a proper noun is not found, the rightmost regular noun is selected. If neither a proper nor regular noun is found, the last word at the end of the remaining text is selected. Then, a reasonable number of premodifiers are added to fill the space available (block 160) in the advertising creative 53, summarized search result 54 or summarized Web content 55. By way of continuing example, the summarized text 49 would include the phrase "Y2K Pro-Series Broom." Finally, the text 43 is output (block 161) by providing the final set of selected words for inclusion in the advertising creative 53, summarized search result 54 or summarized Web content 55. The routine then returns.

In a further embodiment, the summarized text 49 is assigned a confidence score that provides an estimate of the quality of the text summary, similar to the optional confidence score assigned when processing phrases by content, described above with reference to FIG. 6. Other forms of confidence scoring are also possible.

Processing Categories

Figure 8:
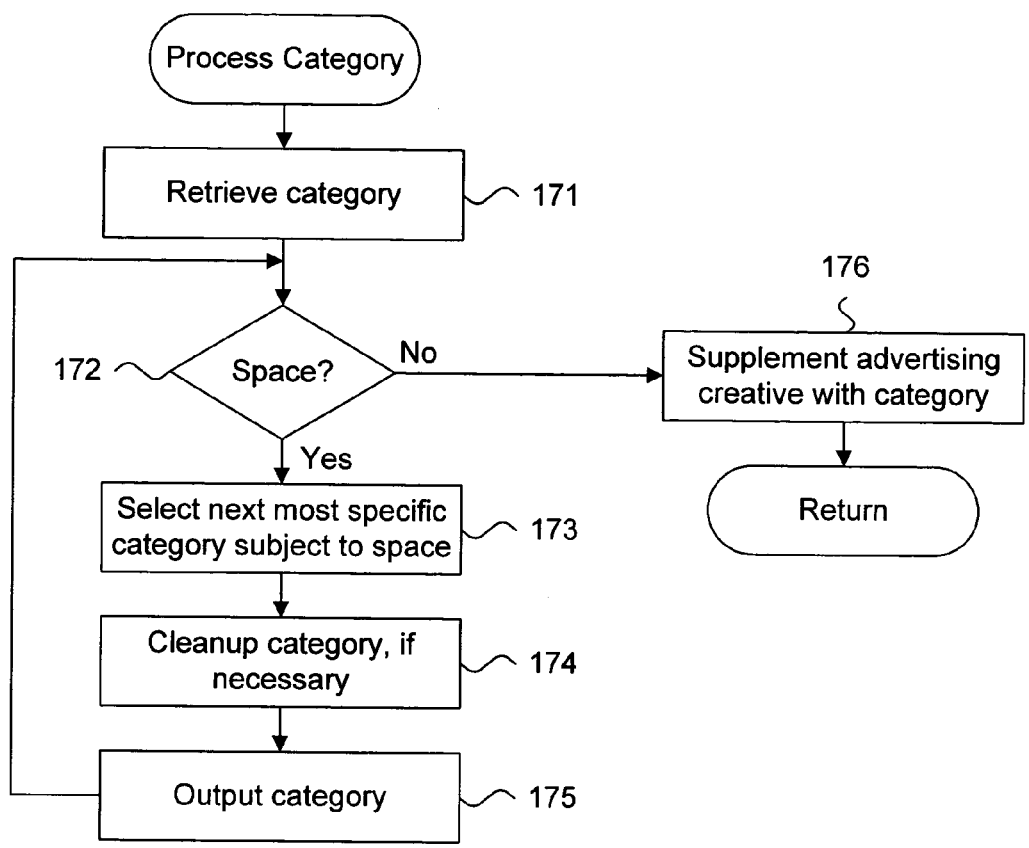
FIG. 8 is a flow diagram showing the routine for processing categories for use in the method of FIG. 5.

FIG. 8 is a flow diagram showing the routine 170 for processing categories for use in the method 110 of FIG. 5. One purpose of this routine is to identify and summarize a category name 98 identified in a product description 61.

A category name is retrieved (block 171). While space is available (block 172), the currently most specific category name 67 is selected, subject to space restrictions in the category name 98 of the advertising creative 96 (block 173). If necessary, the category name 67 is cleaned up (block 174) to provide a meaningful category descriptor. For instance, generic categories, such as "Other," are avoided and redundant categories, such as "Cameras>See All Cameras" is revised into "Cameras." Other forms of category name clean up are possible. The category is then output (block 175).

By way of example, the complete category name 67 including "Household>Cleaning Supplies>Brooms>Adjustable Brooms" can be used as summarized to "Household—Cleaning Supplies—Adjustable Brooms" by combining the most specific category name, "Adjustable Brooms," with the next most specific category name, "Cleaning Supplies." Other hierarchical category name summarizations are possible, as will be appreciated by one skilled in the art.

Finally, the category name 98 section of the body of the advertising creative 96 is supplemented with the category name 97 (block 176), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing text summarization for use in Web-based content, comprising:
    a text identifier to determine text responsive to an executed query comprising one or more query terms;
    a phrase identifier to identify at least one phrase within the text; and
    a phrase summarizer to summarize at least one of the at least one phrase into summarized text, the phrase summarizer including
        a word marker to mark at least one word in the at least one of the at least one phrase using at least one of (A) a match of the at least one word with at least one word of the executed query, and (B) a format rule, and
        a word placer to place the at least one marked word into the summarized text subject to space restrictions.

2. A system according to claim 1, wherein the at least one phrase is identified by content separators evaluated within the text.

3. A system according to claim 2, wherein the content separators comprises at least one of breaking punctuation, parenthetical text and breaking prepositions.

4. A system according to claim 2, further comprising:
    a phrase matcher to match at least one word in the at least one of the at least one phrase with at least one word of the executed query independent of at least one of case and suffixes.

5. A system according to claim 2, further comprising:
    a word locater to locate at least one significant word situated relative to one such matched word within the at least one phrase, and to place the at least one significant word into the summarized text subject to space restrictions.

6. A system according to claim 5, further comprising:
    a word marker to mark one or more unplaced words situated relative to one or more matched words and the at least one significant word within the at least one phrase, and to place one or more marked words or matched words into the summarized text subject to space restrictions.

7. A system according to claim 6, further comprising:
    a word selector to select the marked words in one of right-to-left and left-to-right order.

8. A system according to claim 1, wherein the at least one phrase is identified by parts of speech determined by tagging the parts of speech within the text.

9. A system according to claim 8, further comprising:
a word dropper to drop one or more words situated relative to a grammatical phrase boundary.

10. A system according to claim 9, further comprising:
a word adder to add one or more words situated relative to one or more non-dropped words.

11. A system according to claim 9, further comprising:
a boundary identifier to determine the grammatical phrase boundary based on at least one of one or more predetermined punctuation marks and a prepositional phrase.

12. A system according to claim 11, wherein the predetermined punctuation marks comprise at least one of a hyphen, colon and parenthesis.

13. A system according to claim 8, further comprising:
a word selector to select one or more words situated relative to a grammatical phrase boundary, wherein the word comprises one of a rightmost proper noun, a regular noun immediately following the rightmost proper noun, and a regular noun if the rightmost proper noun is not found, and to place the one or more selected words into the summarized text subject to space restrictions.

14. A system according to claim 1, further comprising:
a confidence level associated with summarized text; and
an evaluator to evaluate a quality of the summarized text based on the confidence level.

15. A system according to claim 14, further comprising:
an adjuster to adjust the confidence level relative to one or more dropped words.

16. A system according to claim 1, wherein at least one word comprises a compound word comprising a plurality of individual words.

17. A system according to claim 1, further comprising:
a case normalizer to normalize the case for letters occurring in each of the zero or more phrases.

18. A system according to claim 1, wherein the text comprises at least one of an advertisement, search results and Web content.

19. A system according to claim 1, wherein the text comprises non-Web content.

20. A system according to claim 1, further comprising:
a text placer to place the summarized text in at least one of an advertising creative, summarized search results and summarized Web content.

21. A system according to claim 1, further comprising:
a text placer to place the summarized text into at least one of a table cell and column entry.

22. A computer-implemented method for providing text summarization for use in Web-based content, comprising:
determining, using a computer system including one or more computing devices, text responsive to an executed query comprising one or more query terms and identifying at least one phrase within the text;
summarizing, using the computer system, at least one of the at least one phrase into summarized text, the act of summarizing including
marking at least one word in the at least one of the at least one phrase using at least one of (A) a match of the at least one word with at least one word of the executed query, and (B) a format rule, and
placing the at least one marked word into the summarized text subject to space restrictions; and
outputting at least some of the summarized text to induce rendering on a networked client device.

23. A computer-implemented method according to claim 22, further comprising:
identifying, using the computer system, the at least one phrase by content separators evaluated within the text.

24. A computer-implemented method according to claim 23, wherein the content separators comprises at least one of breaking punctuation, parenthetical text and breaking prepositions.

25. A computer-implemented method according to claim 23, further comprising:
matching, using the computer system, at least one word in the at least one of the at least one phrase with at least one word of the executed query independent of at least one of case and suffixes.

26. A computer-implemented method according to claim 23, further comprising:
locating, using the computer system, at least one significant word situated relative to one such matched word within the at least one phrase; and
placing, using the computer system, the at least one significant word into the summarized text subject to space restrictions.

27. A computer-imlemented method according to claim 26, further comprising:
marking, using the computer system, one or more unplaced words situated relative to one or more matched words and the at least one significant word within the at least one phrase; and
placing one or more marked words or matched words into the summarized text subject to space restrictions.

28. A computer-imlemented method according to claim 27, further comprising:
selecting, using the computer system, the marked words in one of right-to-left and left-to-right order.

29. A computer-implemented method according to claim 22, further comprising:
identifying, using the computer system, the at least one phrase by parts of speech determined by tagging the parts of speech within the text.

30. A computer-implemented method according to claim 29, further comprising:
dropping, using the computer system, one or more words situated relative to a grammatical phrase boundary.

31. A computer-implemented method according to claim 30, further comprising:
adding, using the computer system, one or more words situated relative to one or more non-dropped words.

32. A computer-implemented method according to claim 30, further comprising:
determining, using the computer system, the grammatical phrase boundary based on at least one of one or more predetermined punctuation marks and a prepositional phrase.

33. A computer-implemented method according to claim 32, wherein the predetermined punctuation marks comprise at least one of a hyphen, colon and parenthesis.

34. A computer-imlemented method according to claim 30, further comprising:
selecting, using the computer system, one or more words situated relative to a grammatical phrase boundary, wherein the word comprises one of a rightmost proper noun, a regular noun immediately following the rightmost proper noun, and a regular noun if the rightmost proper noun is not found; and
placing, using the computer system, the one or more selected words into the summarized text subject to space restrictions.

35. A computer-imlemented method according to claim 22, further comprising:
associating, using the computer system, a confidence level with summarized text; and evaluating, using the computer system, a quality of the summarized text based on the confidence level.

36. A computer-imlemented method according to claim 35, further comprising:
adjusting, using the computer system, the confidence level relative to one or more dropped words.

37. A computer-imlemented method according to claim 22, wherein at least one word comprises a compound word comprising a plurality of individual words.

38. A computer-imlemented method according to claim 22, further comprising:
normalizing, using the computer system, the case for letters occurring in each of the zero or more phrases.

39. A computer-imlemented method according to claim 22, wherein the text comprises at least one of an advertisement, search results and Web content.

40. A computer-imlemented method according to claim 22, wherein the text comprises non-Web content.

41. A computer-imlemented method according to claim 22, further comprising:
placing, using the computer system, the summarized text in at least one of an advertising creative, summarized search results and summarized Web content.

42. A computer-imlemented method according to claim 22, further comprising:
placing, using the computer system, the summarized text into at least one of a table cell and column entry.

43. A computer-imlemented method according to claim 22, wherein the computer system includes an ad server, the computer-implemented method further comprising:
providing, using the computer system, the summarized text to the ad server as an advertising creative; and
serving, using the computer system, the advertising creative to induce rendering of the advertising creative on a client device.

44. A computer-readable storage medium holding code for performing a method comprising:
determining, using a computer system including one or more computing devices, text responsive to an executed query comprising one or more query terms and identifying at least one phrase within the text;
summarizing, using the computer system, at least one of the at least one phrase into summarized text, the act of summarizing including
marking at least one word in the at least one of the at least one phrase using at least one of (A) a match of the at least one word with at least one word of the executed query, and (B) a format rule, and
placing the at least one marked word into the summarized text subject to space restrictions; and
outputting at least some of the summarized text to induce rendering on a networked client device.

45. An apparatus for providing text summarization for use in Web-based content, comprising:
means for determining text responsive to an executed query comprising one or more query terms and means for identifying at least one phrase within the text; and
means for summarizing at least one of the at least one phrase into summarized text, the means for summarizing including
means for marking at least one word in the at least one of the at least one phrase using at least one of (A) a match of the at least one word with at least one word of the executed query, and (B) a format rule, and
means for placing the at least one marked word into the summarized text subject to space restrictions.

46. A system for building Web-based advertising creatives, comprising:
an advertising server to identify at least one item description responsive to an executed query comprising one or more query terms;
a phrase identifier to extract a name from the item description and to identify at least one phrase within the name; and
a phrase summarizer to summarize at least one of the at least one phrase into an advertising creative, the phrase summarizer including
a word marker to mark at least one word in the at least one of the at least one phrase using at least one of (A) a match of the at least one word with at least one word of the executed query, and (B) a format rule, and
a word placer to place the at least one marked word into the advertising creative subject to space restrictions.

47. A system according to claim 46, further comprising:
a description identifier to retrieve a description from the item description and to supplement the advertising creative with the description subject to space restrictions.

48. A system according to claim 47, further comprising:
a description summarizer to summarize the description.

49. A system according to claim 46, further comprising:
a parse tree formed from the item description;
a parser to traverse the parse tree for constituents meeting syntactic constraints; and
a description identifier to supplement the advertising creative with the constituents subject to space restrictions.

50. A system according to claim 46, further comprising:
a category identifier to retrieve a category name associated with the item description and supplementing the advertising creative with the category name subject to space restrictions.

51. A system according to claim 50, further comprising:
a hierarchy of categories; and
a category summarizer to summarize the category name by prepending ancestor categories determined from the hierarchy.

52. A system according to claim 51, wherein redundant categories are removed from the category name.

53. A system according to claim 46, further comprising:
a confidence level associated with the category name; and
a category summarizer to select the category name having a substantially best confidence level.

54. A system according to claim 46, further comprising:
a merchant identifier to retrieve a merchant information from the item description and supplementing the advertising creative with the merchant information subject to space restrictions.

55. A system according to claim 46, further comprising:
a case normalizer to normalize the case for letters occurring in each of the zero or more words.

56. A system according to claim 46, wherein the item description comprises at least one of structured and unstructured Web content.

57. A system according to claim 46, wherein the item description comprises at least one of a product description and a service description.

58. A computer-imlemented method for building Web-based advertising creatives, comprising:
identifying, using a computer system including one or more computing devices, at least one item description responsive to an executed query comprising one or more query terms;
extracting, using the computer system, a name from the item description;

identifying, using the computer system, at least one phrase within the name;

summarizing, using the computer system, at least one of the at least one phrase into an advertising creative, the act of summarizing including marking at least one word in the at least one of the at least one phrase using at least one of (A) a match of the at least one word with at least one word of the executed query, and (B) a format rule, and placing the at least one marked word into the advertising creative subject to space restrictions; and outputting the advertising creative to induce rendering on a networked client device.

59. A computer-imlemented method according to claim 58, further comprising:

retrieving, using the computer system, a description from the item description; and supplementing, using the computer system, the advertising creative with the description subject to space restrictions.

60. A computer-imlemented method according to claim 59, further comprising:

summarizing, using the computer system, the description.

61. A computer-imlemented method according to claim 58, further comprising:

forming, using the computer system, the item description into a parse tree;

traversing, using the computer system, the parse tree for constituents meeting syntactic constraints; and supplementing, using the computer system, the advertising creative with the constituents subject to space restrictions.

62. A computer-imlemented method according to claim 58, further comprising:

retrieving, using the computer system, a category name associated with the item description; and supplementing, using the computer system, the advertising creative with the category name subject to space restrictions.

63. A computer-imlemented method according to claim 62, further comprising:

defining, using the computer system, a hierarchy of categories; and summarizing, using the computer system, the category name by prepending ancestor categories determined from the hierarchy.

64. A computer-imlemented method according to claim 63, further comprising:

removing, using the computer system, redundant categories from the category name.

65. A computer-imlemented method according to claim 58, further comprising:

associating, using the computer system, a confidence level with the category name; and selecting, using the computer system, the category name having a substantially best confidence level.

66. A computer-imlemented method according to claim 58, further comprising:

retrieving, using the computer system, a merchant information from the item description; and supplementing, using the computer system, the advertising creative with the merchant information subject to space restrictions.

67. A computer-imlemented method according to claim 58, further comprising:

normalizing, using the computer system, the case for letters occurring in each of the zero or more words.

68. A computer-imlemented method according to claim 58, wherein the item description comprises at least one of structured and unstructured Web content.

69. A computer-imlemented method according to claim 58, wherein the computer system includes an ad server, the computer-implemented method further comprising:

providing, using the computer system, the advertising creative to the ad server; and serving, using the computer system, the advertising creative to induce rendering of the advertising creative on a client device.

70. A computer-imlemented method according to claim 58, wherein the item description comprises at least one of a product description and a service description.

71. A computer-readable storage medium holding code for performing a method comprising:

identifying, using a computer system including one or more computing devices, at least one item description responsive to an executed query comprising one or more query terms;

extracting, using the computer system, a name from the item description;

identifying, using the computer system, at least one phrase within the name;

summarizing, using the computer system, at least one of the at least one phrase into an advertising creative, the act of summarizing including marking at least one word in the at least one of the at least one phrase using at least one of (A) a match of the at least one word with at least one word of the executed query, and (B) a format rule, and placing the at least one marked word into the advertising creative subject to space restrictions; and outputting the advertising creative to induce rendering on a networked client device.

72. An apparatus for building Web-based advertising creatives, comprising:

means for identifying at least one item description responsive to an executed query comprising one or more query terms;

means for extracting a name from the item description;

means for identifying at least one phrase within the name; and means for summarizing at least one of the at least one phrase into an advertising creative, the means for summarizing including means for marking at least one word in the at least one of the at least one phrase using at least one of (A) a match of the at least one word with at least one word of the executed query, and (B) a format rule, and means for placing the at least one marked word into the advertising creative subject to space restrictions.

* * * * *